Dec. 28, 1943.  E. C. WALKER ET AL  2,337,579
FILTER ELEMENT
Filed Sept. 27, 1938    2 Sheets-Sheet 2
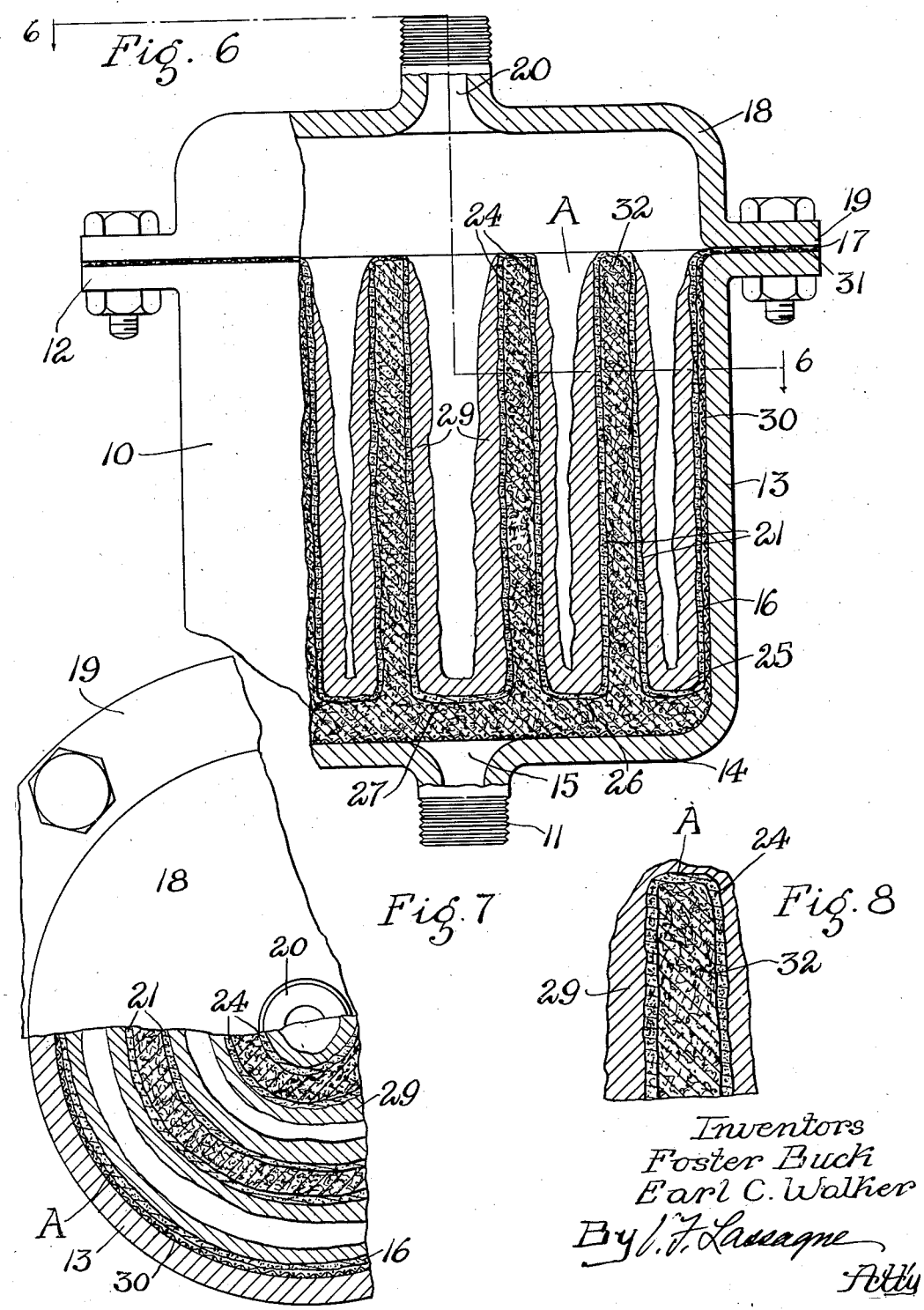
Inventors
Foster Buck
Earl C. Walker
By L. F. Lassagne
Atty Patented Dec. 28, 1943

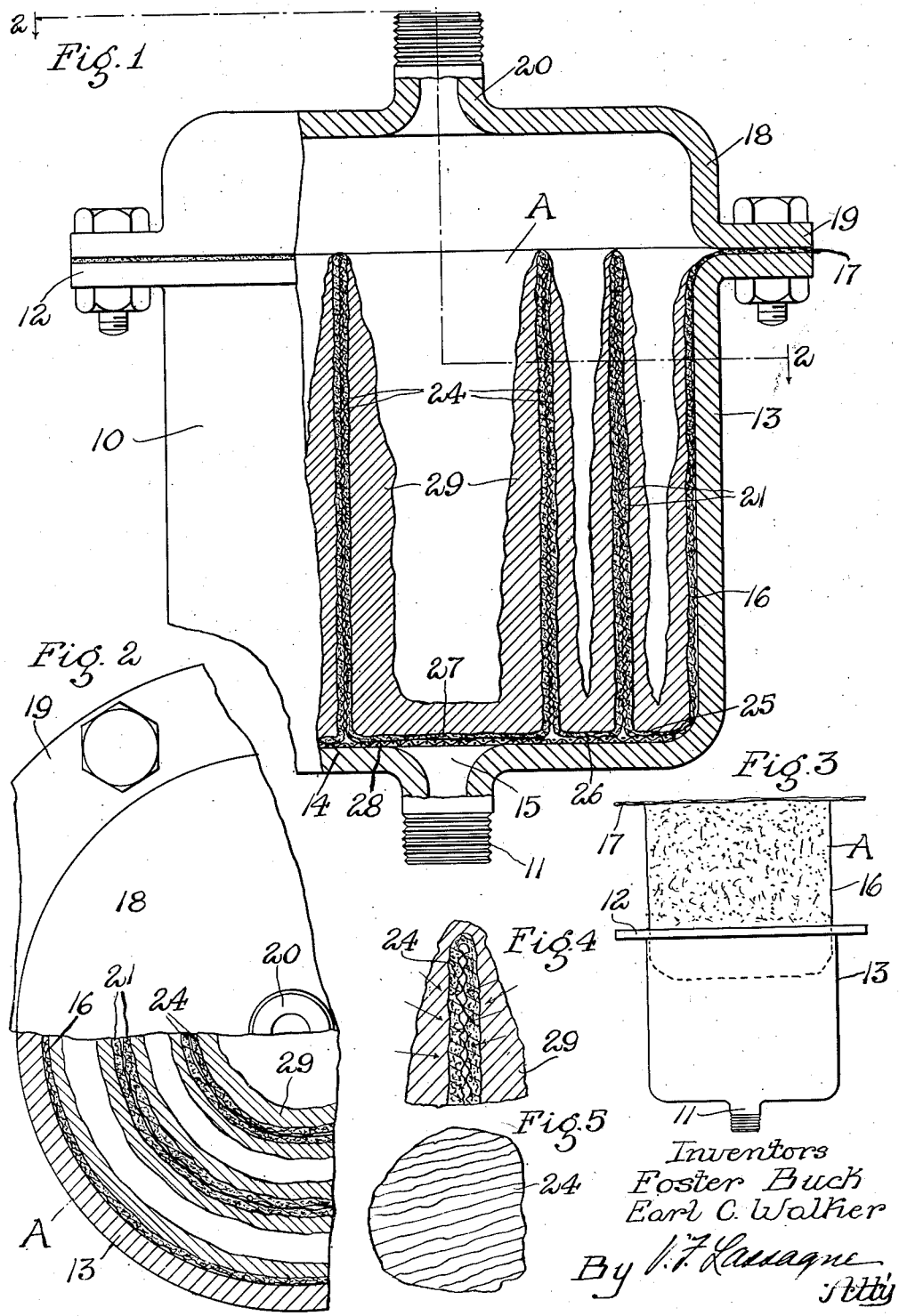

2,337,579

UNITED STATES PATENT OFFICE 2,337,579

FILTER ELEMENT

Earl C. Walker, Chicago, and Foster Buck, Lisle, Ill., assignors to International Harvester Company, a corporation of New Jersey Application September 27, 1938, Serial No. 231,954

6 Claims. (Cl. 210—178)

This invention relates to filters and particularly to oil filters for use in connection with an automotive internal combustion engine.

Attempts have been made to use replaceable filters made of paper or similar material which could be cheaply made whereby they could be discarded and replaced at frequent intervals. Difficulties have been encountered, however, which have not been solved by elements satisfactory to function in a satisfactory manner for the desired length of time.

The object of the present invention is to provide a filter of molded material such, for example, as fiber used in filter paper construction of a design satisfactory for use in a filter of the automotive type.

Another object is to provide such a filter having an extensive area in a relatively small casing whereby oil may be filtered at a sufficient rate and whereby the life of the filter is sufficient to meet requirements.

Another object is to provide a filter of relatively thin fibrous composition which is so constructed that it is self-supporting to resist a substantial filtration pressure differential.

Another object is to provide a filter of a folded design having an extensive area shaped to be removed from a casing with the filtered sludge contained entirely within the filter element whereby it can be removed for disposal without subsequent cleaning of the filter casing and without contamination of the oil in the system.

Another object is to provide a filter element with integral flange to form a sealing gasket as well as a support for said filter element.

These and other objects which will be apparent from the detailed description to follow are attained by the construction such as shown in the drawings:

Figure 1 is a cross sectional view showing a casing in which an element of the cylindrical type is mounted;

Figure 2 is a partial plan view and partial section taken on the line 2—2 of Figure 1;

Figure 3 is an elevation, on a reduced scale, showing the removal of a filter element from its casing;

Figure 4 is an enlarged view of a portion of the element near one of the folds to show the spacing projections and the path of the oil during filtration;

Figure 5 is an elevation of an inside roughened wall portion of the filter element;

Figure 6 is a vertical section showing another type of element in which spacing material is positioned between the wall of the element and the casing wall and between adjacent walls of the filter element;

Figure 7 is a partial section and partial plan view taken on the line 6—6 of Figure 5; and, Figure 8 is an enlarged sectional view of one of the connected double walls of the filter element.

Referring to Figure 1, an open top cylindrical casing 10 is provided with an outlet 11 at the bottom and an outwardly extending flange 12 at the top. The casing has a cylindrical interior wall 13 and a flat bottom wall 14, an outlet conduit 15 communicating with the bottom wall at the center thereof. A filter element A is shaped to fit in the casing 10 with an outer cylindrical wall 16 lying closely adjacent the wall 13. A flange 17 integrally formed with the wall 16 is adapted to extend outwardly over the flange 12. A cover 18 having an outwardly extending flange 19 mating with the flange 12 forms a closure for the casing. An inlet 20 in the cover 18 provides means for delivering oil to be filtered under pressure to the casing 10.

As illustrated in the drawings, the element A includes two upwardly extending double cylindrical wall portions 21 and 24 integrally connected at the top and integrally connected to annular bottom portions 25, 26 and a circular bottom portion 27. It is to be understood that any number of the vertically extending double wall portions 21 and 24 may be utilized. A screen 28 is shown resting on the bottom 26 of the casing. This screen is positioned to support the circular portion 27 against oil pressure within the casing during filtration and to provide a flow passage for filtered oil from the double wall portions 21 and from the casing wall.

The filter element A may be constructed of any fibrous material having a surface which is corrugated, roughened, or otherwise of a nature to allow oil to pass between two adjacent layers or between a layer and a wall of the casing. As illustrated on an enlarged scale in Figures 4 and 5, the material of the element is shown as being provided with spacing means formed as a plurality of small corrugations to provide space for and to enhance the flow of filtered fuel downwardly between the contacting walls. The concentric upstanding double wall portions 21 and 24 are spaced from the casing wall portion and from each other to provide annular spaces sufficient to hold an amount of sludge, slime, and other filtered particles which accumulate during normal life of the filter. To illustrate the depositing of material filtered out during operation, sludge 29 has been indicated along the interior wall of the filter element.

When the filter element has reached the end of its effective life or when the number of hours of filtration has been reached after which a change is to be made, the top 18 of the casing is removed and the filter element A is taken from the casing by grasping the flange 17 around the edge as illustrated in Figure 3. Said flange is not coated with material filtered out during operation so that the entire element containing the filtered-out material may be removed en masse and discarded without contacting or disturbing the sludge and without any required cleaning or any possibility of contaminating the casing or the system with the sludge. A new element may be readily inserted in the casing for continued operation. As the filter is constructed to be supported against pressure by the casing, and where adjacent walls are formed to be supported by transmitting pressure, one against the other, any conventional oil filter pressure may be utilized with a relatively fragile fibrous element without any danger of rupturing the element which would allow impurities to pass therethrough and practically render the filter inoperative.

A modified form of element is shown in Figures 6, 7, and 8. The casing is identical with the form previously described and the same reference characters are utilized both for the casing and for the filter element and its different portions. In this form, the outer wall 16 of the element which lies adjacent the wall 13 of the casing is supported by a screen or perforated element 30 which fits against the wall of the casing and against the bottom 14. A flange 31 on the screen extends outwardly partially over the flange 17 of the casing. The element is removed the same as illustrated in Figure 3, the screen 30 being simultaneously removed.

In this form the cylindrical and concentric double walls 21 and 24 are proximately located and spaced apart. Packing material 32 is located between the adjacent walls. The packing material is also positioned between the annular bottom portions 25 and 26 and the central portion 27 and the bottom portion of the screen 30. It is preferred to use loose porous resilient compressible material whereby the double walls of the element transmit pressure through the intermediacy of the packing material one against the other. By this construction, a thin resilient flexible filter element may be utilized which will withstand a substantial oil pressure. The porous packing material may be impregnated or mixed with suitable chemicals to counteract acidity of the oil or to accomplish other desired results.

It will be understood that applicants have shown and described only certain modifications and embodiments of their improved filter elements, and that they claim as their invention all shapes, arrangements and materials covered by the appended claims.

What is claimed is:

1. An oil filter comprising a casing open at one end, a one-piece filter element mounted in the casing, said element having a flange fitted over the open end of the casing and a substantially cylindrical wall portion lying adjacent the casing wall and adapted to be supported by said wall when oil under pressure is supplied to the casing, said element also including portions lying adjacent the closed end of the casing and upwardly extending contacting cylindrical double wall portions connected to the bottom portions, whereby the double wall portions resist oil pressure one against the other, an outlet from the closed end of the casing, and a cover for the casing provided with an inlet.

2. A liquid filter comprising a casing having an inlet and an outlet, a flexible fibrous filter element mounted in said casing, and means for securing the marginal edges of said element to the casing between the inlet and the outlet, a portion of said element consisting of contacting walls, said walls having roughened faces abutting each other and projecting towards the inlet side of the filter with the fluid from the inlet being delivered against the non-contacting surfaces of the walls, said walls having sufficient stiffness to maintain them in position adjacent to one another when no pressure is applied thereagainst, the contacting relationship of the walls being provided to withstand pressure exerted at the inlet side of the filter element against the non-contacting surfaces thereof and to provide spaces for filtered liquid flow between the walls at the outlet side of the filter element.

3. A liquid filter comprising a casing having an inlet and an outlet, a filter element mounted as a partition between the inlet and outlet in said casing, means for securing the marginal edges of said element to the casing, a portion of said element consisting of two flexible walls having adjacent faces in contact with each other, said walls projecting into the inlet side of the casing with the non-contacting walls being subjected to the inlet fluid whereby said wall structure serves to resist inlet pressure exerted against the outer non-contacting faces thereof, means for supplying liquid under pressure simultaneously against the non-contacting faces, and means withdrawing liquid passing through and between the contacting walls.

4. A liquid filter element adapted to be mounted in a casing provided with means for delivering liquid under pressure to be filtered thereto and with outlet means for removing filtered liquid therefrom, said element being formed of relatively thin, flexible sheet material and including edge portions adapted to be secured in a fluid-tight manner to the casing to thereby form a partition between the means for delivering and the means for removing liquid, a portion of said element being formed as double contacting walls, said element having sufficient stiffness to maintain said walls in position adjacent to one another when no fluid pressure is being applied, said element being arranged in the casing with the non-contacting portions of said walls being subjected to the fluid under pressure whereby said walls are self-resisting against the fluid pressure by abutment one against the other, the contacting walls being in communication with the means for removing liquid whereby filtered liquid passing through and between the contacting surfaces of the walls escapes to the liquid-removing side of the element.

5. A liquid filter element adapted to be mounted in a casing provided with inlet means for delivering liquid to be filtered thereto and outlet means for removing filtered liquid therefrom, said element being formed of relatively thin, molded, paper-like, fibrous sheet material, a portion of said element consisting of double contacting walls supported throughout their contacting portions only by the sheet material, said contacting walls projecting toward the inlet means side of the casing with the inlet fluid pressure acting against the non-contacting portions of the walls whereby pressure of fluid to be filtered on the outside of said walls is resisted by one wall against the other to balance the pressure, said element including a portion adapted to be secured in a fluid-tight manner to the casing between the inlet and outlet means, the contacting walls being roughened to facilitate the flow therebetween and to the outlet side of the element of liquid filtered through the walls.

6. A liquid filter element adapted to be mounted as a partition between the inlet and outlet in a casing provided with means for delivering liquid to be filtered thereto and means for removing filtered liquid therefrom, said element consisting entirely of one piece of relatively thin, fibrous sheet material, a portion of said element consisting of double contacting walls, said portion of the element projecting toward the inlet to the casing and being subjected to the inlet liquid acting against the non-contacting surfaces of the walls.

EARL C. WALKER.
FOSTER BUCK.